(12) United States Patent
Goto

(10) Patent No.: US 11,396,961 B2
(45) Date of Patent: Jul. 26, 2022

(54) COMPOSITION, THREADED JOINT FOR PIPES INCLUDING SOLID LUBRICANT COATING FORMED FROM THE COMPOSITION, AND METHOD FOR PRODUCING THE THREADED JOINT FOR PIPES

(71) Applicants: Nippon Steel & Sumitomo Metal Corporation, Tokyo (JP); Vallourec Oil and Gas France, Aulnoye-Aymeries (FR)

(72) Inventor: Kunio Goto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 199 days.

(21) Appl. No.: 15/760,569

(22) PCT Filed: Sep. 15, 2016

(86) PCT No.: PCT/JP2016/077341
§ 371 (c)(1),
(2) Date: Mar. 15, 2018

(87) PCT Pub. No.: WO2017/047722
PCT Pub. Date: Mar. 23, 2017

(65) Prior Publication Data
US 2018/0274703 A1 Sep. 27, 2018

(30) Foreign Application Priority Data
Sep. 18, 2015 (JP) .............................. JP2015-185025

(51) Int. Cl.
*F16L 15/00* (2006.01)
*C08L 91/06* (2006.01)
(Continued)

(52) U.S. Cl.
CPC ................ *F16L 15/00* (2013.01); *C08K 3/04* (2013.01); *C08K 3/16* (2013.01); *C08K 5/01* (2013.01);
(Continued)

(58) Field of Classification Search
CPC ............. F16L 15/00; C08K 3/04; C08K 3/16; C08K 5/01; C08K 3/32; C08K 3/36; C08K 5/11;
(Continued)

(56) References Cited

U.S. PATENT DOCUMENTS 6,039,784 A * 3/2000 Luk ....................... B22F 1/0059
148/306
2003/0094810 A1* 5/2003 Goto .................... C10M 169/02
285/94

(Continued)

FOREIGN PATENT DOCUMENTS

CN 103384716 A 11/2013
EP 2210931 A1 7/2010
(Continued)

OTHER PUBLICATIONS

Murphy, John, Additives for Plastics Handbook, 2001, Elsevier Science Ltd., 2nd Edition, pp. 169-175.*
English Abstract of CN103384716A.

*Primary Examiner* — Anthony J Frost
(74) *Attorney, Agent, or Firm* — John P. Iwanicki

(57) ABSTRACT

A threaded joint for pipes disclosed herein includes a pin and a box. The pin and the box each include a contact surface including a threaded portion and a metal contact portion. The threaded joint for pipes includes a solid lubricant coating on at least one of the contact surfaces of the pin and the box, the solid lubricant coating including a binder, a lubricant additive, an anti-rust additive, and a plasticizer.

19 Claims, 2 Drawing Sheets

(51) Int. Cl.

| | | |
|---|---|---|
| *C10M 161/00* | (2006.01) | |
| *C09D 5/08* | (2006.01) | |
| *C08K 3/16* | (2006.01) | |
| *C23C 26/00* | (2006.01) | |
| *C08K 3/04* | (2006.01) | |
| *C08L 71/00* | (2006.01) | |
| *C08L 101/00* | (2006.01) | |
| *C10M 163/00* | (2006.01) | |
| *C08L 27/18* | (2006.01) | |
| *C08L 23/02* | (2006.01) | |
| *C09D 7/40* | (2018.01) | |
| *C08L 23/08* | (2006.01) | |
| *C08K 5/01* | (2006.01) | |
| *E21B 17/00* | (2006.01) | |
| *C08K 3/36* | (2006.01) | |
| *C08K 3/32* | (2006.01) | |
| *C08K 5/11* | (2006.01) | |
| *C10N 10/06* | (2006.01) | |
| *C10N 40/34* | (2006.01) | |

(52) U.S. Cl.
CPC ........... *C08L 23/02* (2013.01); *C08L 23/0853* (2013.01); *C08L 27/18* (2013.01); *C08L 71/00* (2013.01); *C08L 91/06* (2013.01); *C08L 101/00* (2013.01); *C09D 5/08* (2013.01); *C09D 7/40* (2018.01); *C10M 161/00* (2013.01); *C10M 163/00* (2013.01); *C23C 26/00* (2013.01); *E21B 17/00* (2013.01); *C08K 3/32* (2013.01); *C08K 3/36* (2013.01); *C08K 5/11* (2013.01); *C10M 2201/041* (2013.01); *C10M 2201/042* (2013.01); *C10M 2201/085* (2013.01); *C10M 2205/02* (2013.01); *C10M 2205/16* (2013.01); *C10M 2207/282* (2013.01); *C10M 2209/062* (2013.01); *C10M 2213/06* (2013.01); *C10M 2213/062* (2013.01); *C10N 2010/06* (2013.01); *C10N 2040/34* (2013.01)

(58) Field of Classification Search
CPC ...... C08L 23/02; C08L 23/0853; C08L 27/18; C08L 71/00; C08L 91/06; C08L 101/00; C09D 5/08; C09D 7/40; C10M 161/00; C10M 163/00; C10M 2201/041; C10M 2201/042; C10M 2201/085; C10M 2205/02; C10M 2205/16; C10M 2207/282; C10M 2209/062; C10M 2213/06; C10M 2213/062; C23C 26/00; E21B 17/00; E21B 17/042; C10N 2010/06; C10N 2040/34
See application file for complete search history.

(56) References Cited

U.S. PATENT DOCUMENTS

| | | | |
|---|---|---|---|
| 2004/0214732 A1 | 10/2004 | Oldiges et al. | |
| 2011/0155019 A1* | 6/2011 | Albright | C04B 26/02 106/675 |
| 2012/0025518 A1* | 2/2012 | Kuranishi | C23C 22/83 285/94 |
| 2014/0284919 A1* | 9/2014 | Goto | E21B 17/042 285/94 |
| 2015/0192229 A1* | 7/2015 | Goto | E21B 17/042 285/94 |

FOREIGN PATENT DOCUMENTS

| | | |
|---|---|---|
| EP | 2780618 A1 | 9/2014 |
| JP | 2003-074763 A | 3/2003 |
| JP | 2011-012251 A | 1/2011 |
| WO | 2009072486 A1 | 6/2009 |
| WO | 2012060474 A1 | 5/2012 |
| WO | 2013073712 A1 | 5/2013 |
| WO | 2014024755 A1 | 2/2014 |

* cited by examiner

COMPOSITION, THREADED JOINT FOR PIPES INCLUDING SOLID LUBRICANT COATING FORMED FROM THE COMPOSITION, AND METHOD FOR PRODUCING THE THREADED JOINT FOR PIPES

RELATED APPLICATIONS

This application is a National Stage Application under 35 U.S.C. 371 of co-pending PCT application PCT/JP2016/077341 designating the United States and filed Sep. 15, 2016; which claims the benefit of JP application number 2015-185025 and filed Sep. 18, 2015 each of which are hereby incorporated by reference in their entireties.

TECHNICAL FIELD

The present invention relates to compositions and in particular to a composition for forming a solid lubricant coating for use in threaded joints for oil country tubular goods, a threaded joint for pipes including a solid lubricant coating formed from the composition, and a method for producing the threaded joint for pipes.

BACKGROUND ART

Oil well pipes are used for drilling of oil fields and natural gas fields. Oil well pipes are formed by coupling a plurality of steel pipes in accordance with the depth of the well. Connection of steel pipes can be carried out by thread fastening using threaded joint for pipes (male and female threads) formed at ends of the two steel pipes or by thread fastening via a short pipe component, referred to as box, which has a thread formed in its inner surface. Because of problems encountered during lowering of oil well pipes or for other reasons, the oil well pipes may be lifted several times, unfastened, and refastened after being inspected for damage at the thread fastening portion.

Typical threaded joint for pipes include a pin and a box. The pin includes a male threaded portion and an unthreaded metal contact portion formed in the outer peripheral surface at the end of the pipe. The box includes a female threaded portion and an unthreaded metal contact portion formed in the inner peripheral surface at the end of the pipe. The threaded portions and unthreaded metal contact portions of the pin and the box repeatedly experience strong frictional sliding during thread fastening and unfastening of the pipes. If these portions are not sufficiently resistant to frictional sliding, galling (uncorrectable seizure) will occur during repeated thread fastening and unfastening and consequently the gas tightness of the threaded joint for pipes will decrease. Thus, it is necessary that threaded joint for pipes have sufficient resistance to frictional sliding, i.e., excellent galling resistance.

Heretofore, heavy metal-containing compound greases, referred to as dopes, have been used to improve the galling resistance. Application of a compound grease to the surface of a threaded joint for pipes can improve the galling resistance of the threaded joint for pipes. However, heavy metals contained in compound greases, such as Pb, Zn, and Cu, may affect the environment. For this reason, practical application of a compound grease-free threaded joint for pipes is desired.

International Application Publication No. WO2009/072486 (Patent Literature 1) and Japanese Patent Application Publication No. 2011-12251 (Patent Literature 2) each propose a threaded joint for pipes that does not include a compound grease but has excellent galling resistance. Japanese Patent Application Publication No. 2003-74763 (Patent Literature 3) discloses a threaded joint for oil well steel pipes that includes a Cu-Sn alloy plating layer disposed on surfaces of certain portions of the threaded joint.

The threaded joint for pipes disclosed in Patent Literature 1 is configured such that the contact surface of the box has a solid lubricant coating having plastic or viscoplastic rheological behavior as the uppermost layer, and the contact surface of the pin has a UV-curable resin-based corrosion protective solid coating as the uppermost layer. According to Patent Literature 1, this configuration makes it possible, without using a compound grease, to obtain a threaded joint in which formation of rust is inhibited and which exhibits excellent galling resistance and gas tightness, and also which is not sticky at the surface and has excellent appearance and ease of inspection.

The photocurable composition disclosed in Patent Literature 2 includes the following components (A) to (G): (A) a photocurable (meth)acrylate resin; (B) a (meth)acrylate monomer selected from a monofunctional (meth)acrylate monomer and a difunctional (meth)acrylate monomer; (C) a trifunctional or higher multifunctional (meth)acrylate monomer; (D) a photopolymerization initiator; (E) a benzotriazole anti-rust agent; (F) an anti-rust pigment selected from a phosphate anti-rust pigment and calcium ion-exchanged silica; and (G) a phosphate ester. Patent Literature 2 discloses that, with the use of this photocurable composition, it is possible to form, on the surface of the threaded joint for pipes, a photocured coating that exhibits excellent gas tightness, adhesion properties to the base metal, lubricity, galling resistance, and corrosion resistance, and furthermore, which is thin and highly transparent.

Oil country tubular goods, after production, are transported by ship or by other means and stored for a certain period of time before being used. In some cases, the transport and storage of oil country tubular goods extend for a long time. Furthermore, in some cases, oil country tubular goods are stored in an outdoor location. When oil country tubular goods are stored in an outdoor location for a long period of time, the threaded joint for pipes sometimes become corroded, which can result in decreased galling resistance and gas tightness of the threaded joint for pipes. Therefore, it is necessary that threaded joint for pipes have not only excellent galling resistance but also excellent corrosion resistance.

CITATION LIST

Patent Literature

Patent Literature 1: International Application Publication No. WO2009/072486
Patent Literature 2: Japanese Patent Application Publication No. 2011-12251
Patent Literature 3: Japanese Patent Application Publication No. 2003-74763

SUMMARY OF INVENTION

Technical Problem

The threaded joint for pipes disclosed in the patent literatures mentioned above have excellent adhesion properties and lubricity of the solid lubricant coatings in service environments at ordinary temperatures. Thus, they exhibit sufficient galling resistance in ordinary temperature environments. However, the temperatures in environments where oil country tubular goods are used are high or low in some cases. Solid lubricant coatings have coefficients of thermal expansion different from those of the base metals of threaded joint for pipes. If the temperature in the environment where oil country tubular goods are used is high, the adhesion properties of the solid lubricant coating will decrease. In addition, if the temperature in the environment where oil country tubular goods are used is high, the solid lubricant coating will soften and be oxidized. This further decreases the adhesion properties of the solid lubricant coating. On the other hand, if the temperature in the environment where oil country tubular goods are used is extremely low, the solid lubricant coating will harden and be embrittled. This decreases the adhesion properties of the solid lubricant coating. If the adhesion properties of the solid lubricant coating are decreased, delamination or partial damage will occur in the solid lubricant coating, which will result in decreased galling resistance of the threaded joint for pipes. In addition, in some cases, oil country tubular goods are exposed to high temperatures during transportation and exposed to extremely low temperatures during use. Thus, it is necessary that solid lubricant coatings formed on threaded joint for pipes exhibit high adhesion properties even when they are repeatedly exposed to high temperatures and extremely low temperatures.

An object of the present invention is to provide a composition for forming a solid lubricant coating that exhibits high adhesion properties even when it is repeatedly exposed to high temperatures and extremely low temperatures, a threaded joint for pipes including a solid lubricant coating formed from the composition and which exhibits excellent galling resistance and corrosion resistance, and a method for producing the threaded joint for pipes.

Solution to Problem

A composition according to the present embodiment is a composition for forming a solid lubricant coating on a threaded joint for pipes, the composition including a binder, a lubricant additive, an anti-rust additive, and a plasticizer.

A threaded joint for pipes according to the present embodiment is a threaded joint that is for pipes and that includes a pin and a box. The pin and the box each include a contact surface that includes a threaded portion and an unthreaded metal contact portion. The threaded joint for pipes includes a solid lubricant coating on at least one of the contact surfaces of the pin and the box. The solid lubricant coating includes a binder, a lubricant additive, an anti-rust additive, and a plasticizer.

A method according to the present embodiment for producing the threaded joint for pipes includes applying the above-mentioned composition to at least one of the contact surfaces of the above-mentioned pin and the above-mentioned box, and solidifying the composition applied to the contact surface to form the solid lubricant coating.

Advantageous Effects of Invention

The solid lubricant coating formed from the composition of the present embodiment includes a plasticizer. This enables the coating to exhibit high adhesion properties even when it is repeatedly exposed to high temperatures and extremely low temperatures. Threaded joint for pipes including the solid lubricant coating formed from the composition exhibit excellent galling resistance even when they are repeatedly exposed to high temperatures and extremely low temperatures. Furthermore, the threaded joint for pipes exhibit excellent corrosion resistance.

DESCRIPTION OF EMBODIMENTS

Figure 1:
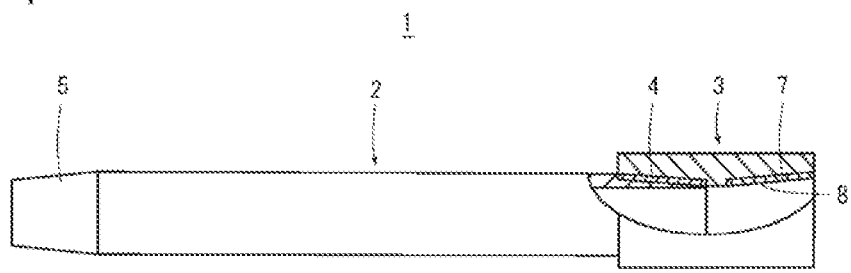
FIG. 1 is a diagram illustrating a configuration of a threaded joint for pipes according to the present embodiment.

The present embodiment will be described in detail below with reference to the drawings. The same reference symbols will be used throughout the drawings to refer to the same or like parts, and description thereof will not be repeated.

A composition according to the present embodiment is a composition for forming a solid lubricant coating on a threaded joint for pipes and the composition includes a binder, a lubricant additive, an anti-rust additive, and a plasticizer.

The solid lubricant coating formed from the composition of the present embodiment includes a plasticizer. This enables the coating to exhibit high adhesion properties even when it is repeatedly exposed to high temperatures and extremely low temperatures.

The plasticizer preferably includes at least one selected from the group consisting of bis(2-ethylhexyl) adipate and bis(2-ethylhexyl) sebacate.

This further increases the adhesion properties of the solid lubricant coating.

In the composition, the content of the plasticizer is preferably in the range of 0.2 to 5 mass %. This further increases the adhesion properties of the solid lubricant coating.

As described later, in the case where the composition contains a solvent, "the content of the plasticizer" refers to the percentage by mass of the plasticizer relative to the total mass, as being 100%, of all components excluding the solvent contained in the composition. In the case where the composition does not contain a solvent, "the content of the plasticizer" refers to the percentage by mass of the plasticizer relative to the mass of the entire composition as being 100%.

Preferably, in the composition, the binder includes at least one selected from the group consisting of an ethylene vinyl acetate resin, a polyolefin resin, and a wax; the lubricant additive includes at least one selected from the group consisting of earthy graphite, graphite fluoride, perfluoropolyether and polytetrafluoroethylene; and the anti-rust additive includes at least one selected from the group consisting of calcium ion-exchanged silica and aluminum phosphite.

The threaded joint for pipes according to the present embodiment is a threaded joint that is for pipes and that includes a pin and a box. The pin and the box each include a contact surface that includes a threaded portion and an unthreaded metal contact portion. The threaded joint for pipes includes a solid lubricant coating on at least one of the contact surfaces of the pin and the box. The solid lubricant coating includes a binder, a lubricant additive, an anti-rust additive, and a plasticizer.

The threaded joint for pipes according to the present embodiment includes a solid lubricant coating that includes a plasticizer. As a result, the threaded joint for pipes exhibits excellent galling resistance even when it is repeatedly exposed to high temperatures and extremely low temperatures. Furthermore, the threaded joint for pipes exhibits excellent corrosion resistance.

In the threaded joint for pipes, the solid lubricant coating includes, for example, the binder in an amount of 60 to 80 mass %, the lubricant additive in an amount of 10 to 25 mass %, the anti-rust additive in an amount of 2 to 10 mass %, and the plasticizer in an amount of 0.2 to 5 mass %.

Optionally, in the threaded joint for pipes, one of the contact surfaces of the pin and the box may include the solid lubricant coating and the other of the contact surfaces of the pin and the box may include a corrosion protective solid coating including a UV-curable resin.

This further increases the corrosion resistance of the threaded joint for pipes.

In the threaded joint for pipes, the thickness of the corrosion protective solid coating is in the range of 5 to 50 μm, for example.

In the threaded joint for pipes, the thickness of the solid lubricant coating is in the range of 10 to 200 μm, for example.

A method according to the present embodiment for producing the threaded joint for pipes includes applying the composition to at least one of the contact surfaces of the pin and the box, and solidifying the composition applied to the contact surface to form the solid lubricant coating.

The production method may include: applying the composition to one of the contact surfaces of the pin and the box; solidifying the composition applied to the contact surface to form the solid lubricant coating; applying a composition, which containing a UV-curable resin, for forming a corrosion protective solid coating to the other of the contact surfaces of the pin and the box; and irradiating, with UV light, the contact surface having the composition for forming the corrosion protective solid coating applied thereto, to form a corrosion protective solid coating. In other words, the production method may include a step (a) of forming a solid lubricant coating and a step (b) of forming a corrosion protective solid coating. The step (a) of forming a solid lubricant coating includes a step (a-1) of applying the composition to one of the contact surfaces of the pin and the box and a step (a-2) of solidifying the composition applied to the contact surface to form the solid lubricant coating. The step (b) of forming a corrosion protective solid coating includes a step (b-1) of applying a composition, which containing a UV-curable resin, for forming a corrosion protective solid coating to the other of the contact surfaces of the pin and the box and a step (b-2) of irradiating, with UV light, the contact surface having the composition for forming the corrosion protective solid coating applied thereto, to form a corrosion protective solid coating. The order of the above-mentioned steps is not limited as long as the step (a-1) precedes the step (a-2) and the step (b-1) precedes the step (b-2).

Preferably, the production method further includes subjecting the contact surface to which the composition for forming the solid lubricant coating is to be applied to a surface preparation treatment prior to application of the composition, the surface preparation treatment being at least one selected from the group consisting of a sand blasting treatment, a pickling treatment, a phosphate chemical conversion treatment, and a zinc alloy plating treatment.

In the production method, the surface preparation treatment may include a zinc alloy plating treatment. In such a case, the production method preferably further includes performing a trivalent chromating treatment that is performed subsequent to the zinc alloy plating treatment and prior to the application of the composition for forming the solid lubricant coating. The trivalent chromating treatment is performed on at least one of the contact surfaces of the pin and the box, the at least one contact surface having been subjected to the zinc alloy plating treatment.

This further increases the corrosion resistance of the threaded joint for pipes.

Hereinafter, the composition, threaded joint for pipes, and method for producing the threaded joint for pipes of the present embodiment will be described in detail.

Threaded Joint for Pipes

The threaded joint for pipes includes a pin and a box. FIG. 1 is a diagram illustrating a configuration of the threaded joint for pipes according to the present embodiment. A threaded joint 1 for pipes includes pins 5 formed at both ends of a steel pipe 2 and boxes 8 formed at both ends of a coupling 3. The pin 5 is formed at each end of the steel pipe 2 and the pin 5 includes a male threaded portion 4 in its outer surface. The box 8 is formed at each end of the coupling 3 and the box 8 includes a female threaded portion 7 in its inner surface. By fastening the pin 5 and box 8 together, the coupling 3 is attached to the end of the steel pipe 2. Although not illustrated in the drawings, a pin 5 of the steel pipe 2 and a box 8 of the coupling 3 that are not coupled to a mating member may have a protector (not illustrated) attached thereto for protecting their threaded portions.

A typical threaded joint for pipes is of the coupling type like the one illustrated in FIG. 1, which includes the steel pipe 2 and the coupling 3. Also known is a threaded joint for pipes of the integral type, in which one end of a steel pipe is in the form of a pin and the other end thereof is in the form of a box, with no coupling used. The threaded joint for pipes of the present embodiment may be employed either as a coupling type threaded joint or as an integral type threaded joint.

Figure 2:
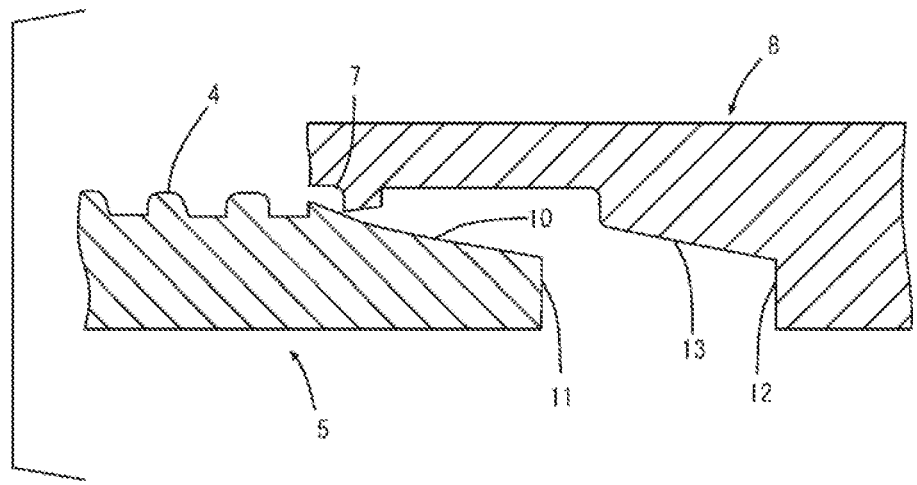
FIG. 2 is a cross-sectional view of the threaded joint for pipes according to the present embodiment.

The pin and the box each include a contact surface that includes a threaded portion and an unthreaded metal contact portion. FIG. 2 is a cross-sectional view of the threaded joint for pipes according to the present embodiment. The pin 5 includes the male threaded portion 4 and the unthreaded metal contact portion. The unthreaded metal contact portion is formed at the tip end of the pin 5 and includes a metal seal portion 10 and a shoulder portion 11. The box 8 includes the female threaded portion 7 and the metal contact portion. The unthreaded metal contact portion of the box 8 includes a metal seal portion 13 and a shoulder portion 12. The portion at which the pin 5 and the box 8 come into contact with each other when they are fastened together is referred to as the contact surface. Specifically, when the pin 5 and the box 8 have been fastened to each other, the two shoulder portions (shoulder portions 11 and 12) come into contact with each other, and so do the two metal seal portions (metal seal portions 10 and 13) and the two threaded portions (male threaded portion 4 and female threaded portion 7). That is, the contact surface includes the shoulder portion, the metal seal portion, and the threaded portion.

Figure 3:
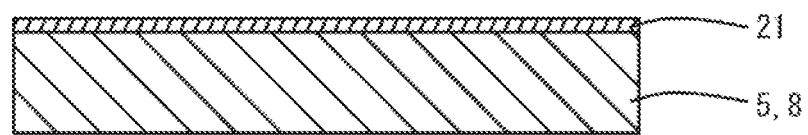
FIG. 3 is a cross-sectional view of a contact surface of the threaded joint for pipes according to the present embodiment.

In the threaded joint 1 for pipes, at least one of the pin 5 and box 8 includes a solid lubricant coating on its contact surface. FIG. 3 is a cross-sectional view of a contact surface of the threaded joint for pipes according to the present embodiment. The solid lubricant coating 21 is formed by applying the composition for forming the solid lubricant coating 21 to at least one of the contact surfaces of the pin 5 and the box 8 and solidifying the composition. The solid lubricant coating 21 includes a binder, a lubricant additive, an anti-rust additive, and a plasticizer. Accordingly, the composition for forming the solid lubricant coating 21 includes the binder, the lubricant additive, the anti-rust additive, and the plasticizer. The composition may either be a composition of a solventless type (i.e., including the above-described components only) or be a composition of a solvent type in which the components are dissolved in a solvent. In the case of a composition of a solvent type, the mass percentage of each component refers to a mass percentage of the component relative to the total mass, as being 100%, of all components excluding the solvent contained in the composition. That is, the content of each component in the composition and the content of each component in the solid lubricant coating 21 are equal to each other. Hereinafter, the composition for forming the solid lubricant coating 21 is also referred to simply as "the composition".

The solid lubricant coating 21 includes a plasticizer. This enables the solid lubricant coating 21 to exhibit high adhesion properties. Below, each component will be described in detail.

Binder

The binder includes at least one selected from the group consisting of an ethylene vinyl acetate resin, a polyolefin resin, and a wax.

The ethylene vinyl acetate resin is a copolymer of ethylene and vinyl acetate. The ethylene vinyl acetate resin is, for example, HM224 manufactured by CEMEDINE CO., LTD. (softening point: 86° C.).

The polyolefin resin generically refers to polymers that can be obtained by polymerizing olefin (alkene). The polyolefin resin is a crystalline polymer and therefore its physical properties vary depending on the crystallinity. Examples of the polyolefin resin include polyethylene and polypropylene. Specific examples of the polyolefin resin include HM712 manufactured by CEMEDINE CO., LTD. (softening point: 120° C.).

The wax inhibits galling by reducing friction on the solid lubricant coating. In addition, the wax adjusts the hardness of the solid lubricant coating and increases the toughness of the solid lubricant coating. The wax may be an animal wax, a vegetable wax, a mineral wax, or a synthetic wax. Examples of the wax that may be employed include: beeswax and whale tallow (animal waxes); Japan wax, carnauba wax, candelilla wax, and rice wax (vegetable waxes); paraffin wax, microcrystalline wax, petrolatum, montan wax, ozokerite, and ceresin (mineral waxes); and oxide wax, polyethylene wax, Fischer-Tropsch wax, amide wax, and hardened castor oil (castor wax) (synthetic waxes). The wax is preferably solid at ordinary temperatures. The lower limit of the melting point of the wax is preferably not less than 40° C. By using a wax that is solid at ordinary temperatures, the adhesion strength of the solid lubricant coating around ordinary temperatures can be controlled to be within an appropriate range.

If the melting temperature of the binder is too high, application of the composition by a hot melt process becomes difficult. On the other hand, if the melting temperature of the binder is too low, the solid lubricant coating 21, in high-temperature environments, may soften and consequently have decreased adhesion properties. Thus, the binder preferably includes at least one selected from the group consisting of an ethylene vinyl acetate resin having a melting temperature (or softening temperature) in the range of 80 to 320° C. and a polyolefin resin having a melting temperature (or softening temperature) in the range of 80 to 320° C. More preferably, the binder includes at least one selected from the group consisting of an ethylene vinyl acetate resin having a melting temperature (or softening temperature) in the range of 90 to 200° C. and a polyolefin resin having a melting temperature (or softening temperature) in the range of 90 to 200° C.

The ethylene vinyl acetate resin is preferably a mixture of two or more ethylene vinyl acetate resins having different melting temperatures in order to inhibit rapid softening due to a temperature increase. Likewise, the polyolefin resin is preferably a mixture of two or more polyolefin resins having different melting temperatures.

The content of the binder in the solid lubricant coating 21 is preferably in the range of 60 to 80 mass %. When the content of the binder is not less than 60 mass %, the solid lubricant coating 21 exhibits further increased adhesion properties. When the content of the binder is not greater than 80 mass %, the solid lubricant coating 21 retains lubricity in a more favorable manner.

Lubricant Additive

The composition includes a lubricant additive to increase the lubricity of the solid lubricant coating 21 further. The lubricant additive generically refers to additives having lubricity. Lubricant additives can be categorized into the following five types. The lubricant additive includes at least one selected from the group consisting of the following (1) to (5):

(1) Lubricant additives having a particular crystal structure, such as a lamellar hexagonal crystal structure, in which a slip easily occurs and which thereby exhibits lubricity (e.g., graphite, zinc oxide, and boron nitride);

(2) Lubricant additives including a reactive element in addition to a particular crystal structure and thereby exhibiting lubricity (e.g., molybdenum disulfide, tungsten disulfide, graphite fluoride, tin sulfide, and bismuth sulfide);

(3) Lubricant additives exhibiting lubricity due to chemical reactivity (e.g., certain types of thiosulfate compounds);

(4) Lubricant additives exhibiting lubricity due to plastic or viscoplastic behavior under frictional stresses (e.g., polytetrafluoroethylene (PTFE) and polyamide); and (5) Lubricant additives that are in liquid form or in grease form and exhibiting lubricity by existing at the interface between the contact surfaces and preventing direct surface-to-surface contact (e.g., a perfluoropolyether (PFPE)).

Any of the above lubricant additives (1) to (5) may be employed. One of the above lubricant additives (1) to (5) may be used alone. For example, the lubricant additive (1) may be used alone. Two or more of the above lubricant additives (1) to (5) may be used in combination. For example, in addition to the lubricant additive (1), the lubricant additives (4) and (5) may be used in combination.

Preferably, the lubricant additive includes at least one selected from the group consisting of the above lubricant additives (1), (4), and (5). Among the lubricant additives (1), graphite is preferred from the standpoint of adhesion properties and anti-rust properties of the solid lubricant coating 21 or earthy graphite is preferred from the standpoint of film forming properties. Among the lubricant additive (4), polytetrafluoroethylene (PTFE) is preferred. Among the lubricant additives (5), a fluorinated additive is preferred. Fluorinated additives improve lubricity during the sliding movement. Furthermore, fluorinated additives increase the toughness of the solid lubricant coating 21 at extremely low temperatures. Examples of fluorinated additives include liquid perfluoropolyethers (PFPE) and grease form of fluorinated polymers. Examples of usable lubricant additives also include modified perfluoropolyethers having a basic structure of a fluorinated polyether with a molecular weight in the range of 500 to 10000, for example.

The content of the lubricant additive in the solid lubricant coating 21 is preferably in the range of 10 to 25 mass %. When the content of the lubricant additive is not less than 10 mass %, the galling resistance is further enhanced. This increases the number of operations of thread fastening and unfastening that can be performed before galling occurs. On the other hand, when the content of the lubricant additive is not greater than 25 mass %, the solid lubricant coating 21 exhibits further increased strength. As a result, wear of the solid lubricant coating 21 is inhibited.

Anti-Rust Additive

The solid lubricant coating 21 needs to have anti-rust properties that can be maintained for a long period of time before being actually used. For this reason, the composition includes an anti-rust additive. The anti-rust additive generically refers to additives having corrosion resistance properties. The anti-rust additive includes, for example, at least one selected from the group consisting of aluminum tripolyphosphate, aluminum phosphite, and calcium ion-exchanged silica. Preferably, the anti-rust additive includes at least one selected from the group consisting of calcium ion-exchanged silica and aluminum phosphite. Other examples of the anti-rust additives that may be employed include a commercially available water repellent agent (e.g., a reactive water repellent agent).

The content of the anti-rust additive in the solid lubricant coating 21 is preferably in the range of 2 to 10 mass %. When the content of the anti-rust additive is not less than 2 mass %, the solid lubricant coating 21 exhibits consistently high anti-rust properties. On the other hand, when the content of the anti-rust additive is not greater than 10 mass %, the solid lubricant coating 21 exhibits consistently high lubricity. If the content of the anti-rust additive is greater than 10 mass %, the anti-rust effect will reach saturation.

Plasticizer

The solid lubricant coating 21 includes a plasticizer. Thus, the solid lubricant coating 21 has high flexibility. As a result, even when the threaded joint 1 for pipes thermally expands in a high temperature environment, delamination of the solid lubricant coating 21 is inhibited. Also, in an extremely low temperature environment, the solid lubricant coating 21 exhibits high flexibility. Thus, in an extremely low temperature environment as well, delamination of the solid lubricant coating 21 due to contraction is inhibited. That is, the high adhesion properties of the solid lubricant coating 21 are maintained even when it is repeatedly exposed to a high temperature (70° C.) and an extremely low temperature (−60° C.). For example, even when the solid lubricant coating 21 is subjected to friction caused by attachment and detachment of the protector, damage and delamination of the solid lubricant coating 21 are inhibited. Thus, the threaded joint 1 for pipes including the solid lubricant coating 21 formed from the composition exhibits excellent galling resistance even when it is repeatedly exposed to a high temperature (70° C.) and an extremely low temperature (−60° C.).

Without limitation, any plasticizers that are commonly used may be employed as the plasticizer. For example, the plasticizer includes at least one selected from the group consisting of a phthalate ester, an adipate ester, a trimellitate ester, a phosphate ester, a citrate ester, an epoxidized vegetable oil, a sebacate ester, an azelate ester, a maleic ester, a benzoate ester, and a low molecular polyester prepared by reaction of a carboxylic acid with a glycol. Examples of the phthalate ester include dimethyl phthalate (DMP), diethyl phthalate (DEP), dibutyl phthalate (DBP), bis(2-ethylhexyl) phthalate (DOP or DEHP), di-n-octyl phthalate (DnOP), diisononyl phthalate (DINP), dinonyl phthalate (DNP), diisodecyl phthalate (DIDP), and butyl benzyl phthalate (BBP). Examples of the adipate ester include bis(2-ethylhexyl) adipate (DOA), diisononyl adipate (DINA), di-n-alkyl adipate ($C_6$, $C_8$, $C_{10}$), and dialkyl adipate ($C_7$, $C_9$). Examples of the trimellitate ester include trioctyl trimellitate (TOTM). Examples of the phosphate ester include tricresyl phosphate (TCP). Examples of the citrate ester include acetyl tributyl citrate (ATBC). Examples of the epoxidized vegetable oil include epoxidized soybean oil (ESBO) and epoxidized linseed oil (ELSO). Examples of the sebacate ester include dibutyl sebacate (DBS) and bis(2-ethylhexyl) sebacate (DOS). Examples of the azelate ester include bis(2-ethylhexyl) azelate. The plasticizer may include only one of these or may include two or more of these.

Preferably, the plasticizer includes at least one selected from the group consisting of bis(2-ethylhexyl) adipate, diisodecyl adipate, diisononyl adipate, bis(2-ethylhexyl) sebacate, tricresyl phosphate, and bis(2-ethylhexyl) azelate. More preferably, the plasticizer includes at least one selected from the group consisting of bis(2-ethylhexyl) adipate and bis(2-ethylhexyl) sebacate. Still more preferably, the plasticizer is bis(2-ethylhexyl) sebacate.

It is preferred that the content of the plasticizer in the solid lubricant coating 21 is in the range of 0.2 to 5 mass %. When the content of the plasticizer is not less than 0.2 mass %, the solid lubricant coating 21 exhibits consistently high adhesion properties. When the content of the plasticizer is not greater than 5 mass %, a decrease in lubricity of the lubricant coating 21 is inhibited and further the strength of the solid lubricant coating 21 increases. Even if the content of the plasticizer is increased to greater than 5 mass %, the advantageous effects described above will reach a saturation. The lower limit of the content of the plasticizer in the composition (or in the solid lubricant coating 21) is more preferably 0.3 mass % and still more preferably 0.5 mass %. The upper limit of the content of the plasticizer in the composition (or in the solid lubricant coating 21) is more preferably 3 mass % and still more preferably 2 mass %.

Other Components

The composition of the present embodiment may include, in addition to the components described above, small amounts of additive components such as a surfactant, a coloring agent, an antioxidant, and an inorganic powder for adjustment of the sliding properties. Examples of the inorganic powder include a powder of titanium dioxide and a powder of bismuth oxide. The content of the other components is, for example, not greater than 5 mass % in total. The composition may further include additives such as an extreme pressure agent and a liquid lubricant in very small amounts, i.e., not greater than 2 mass %.

The composition of the present embodiment can be prepared by mixing together the above-described binder, lubricant additive, anti-rust additive, plasticizer, and other components.

Solid Lubricant Coating 21

The solid lubricant coating 21 is formed by applying the composition to at least one of the contact surfaces of the pin 5 and the box 8 and solidifying the composition. As discussed above, the solid lubricant coating 21 includes a plasticizer. By virtue of the inclusion of a plasticizer, the solid lubricant coating 21 exhibits excellent adhesion properties even when it is repeatedly exposed to a high temperature (70° C.) and an extremely low temperature (−60° C.).

With reference to FIG. 1, at the pipe end portion where the pin 5 and box 8 are to be fastened together prior to shipment, the lubricant coating 21 may be formed only on one of the contact surfaces of the pin 5 and the box 8 before fastening. In this case, application of the composition to the short-length coupling 3 is easier than to the long-length steel pipe 2. Thus, it is preferred that the solid lubricant coating 21 is formed on the contact surface of the coupling 3. At the pipe end portion where the fastening of the pin 5 onto the box 8 is not to be carried out prior to shipment, the solid lubricant coating 21 may be formed on both contact surfaces of the pin 5 and the box 8 to impart anti-rust properties as well as lubricity to them. Alternatively, the solid lubricant coating 21 may be formed only on one of the contact surfaces of the pin 5 and the box 8 and a corrosion protective solid coating, described below, may be formed on the other contact surface. In either case, galling resistance, gas tightness, and anti-rust properties are imparted to the threaded joint for pipes.

Preferably, the solid lubricant coating 21 covers the entire contact surface of at least one of the pin 5 and the box 8. The solid lubricant coating 21 may cover only part of the contact surface (e.g., only the metal seal portions 10, 13).

The solid lubricant coating 21 may be formed of a single layer or multiple layers. The term "multiple layers" refers to two or more layers of the solid lubricant coating 21 deposited in sequence on the contact surface. The two or more layers of the solid lubricant coating 21 can be formed by repeating the application and solidification of the composition. The solid lubricant coating 21 may be formed directly on the contact surface or may be formed after a surface preparation treatment(s) described below is performed on the contact surface.

The thickness of the solid lubricant coating 21 is preferably in the range of 10 to 200 μm and is more preferably in the range of 25 to 100 μm. When the thickness of the solid lubricant coating 21 is not less than 10 μm, the threaded joint 1 for pipes exhibits further increased lubricity and further increased galling resistance. The solid lubricant coating 21 has corrosion resistance in addition to lubricity. Thus, when the thickness of the solid lubricant coating 21 is not less than 10 μm, the threaded joint 1 for pipes exhibits further increased corrosion resistance. When the solid lubricant coating 21 is formed of multiple layers, the thickness of the solid lubricant coating 21 is defined as the sum of the thicknesses of deposited layers of the solid lubricant coating 21. When the solid lubricant coating 21 is a thin film having a thickness of not greater than 25 μm, a solid or liquid thin anti-rust coating may be formed on or under the solid lubricant coating 21.

When a surface preparation treatment(s) described below is to be carried out, it is preferred that the thickness of the solid lubricant coating 21 is greater than the surface roughness of the substrate. When the thickness of the solid lubricant coating 21 is greater than the surface roughness of the substrate, the solid lubricant coating 21 can cover the substrate completely. When the substrate has a roughened surface, the thickness of the solid lubricant coating 21 is defined as the average thickness of the entire solid lubricant coating 21, which is calculated from the area, mass, and density of the solid lubricant coating 21.

Specifically, the thickness of the solid lubricant coating 21 is calculated in the following manner The solid lubricant coating is applied to a flat plate under the same conditions as those for applying the solid lubricant coating 21 to a threaded joint for pipes. Among conditions for coating the threaded joint for pipes and the flat plate, conditions such as the following, for example, are to be matched: the distance between the object to be coated and the tip of the nozzle, spray pressure, viscosity of the composition, and the rotational speed of the object to be coated. To match the viscosities of the composition, the temperatures of the tank, tube, and nozzle head are to be matched between the threaded joint for pipes and the flat plate. The amount of the composition applied per unit time is calculated from the difference between the weight of the flat plate before application of the composition and the weight of the flat plate after application of the composition. The composition is solidified on the flat plate to form the solid lubricant coating 21. The thickness of the solid lubricant coating 21 is measured using a thickness meter. The weight of the solid lubricant coating 21 is calculated from the difference between the weight of the flat plate before application of the composition and the weight of the flat plate after formation of the solid lubricant coating 21. The density of the solid lubricant coating 21 is calculated from the thickness and weight of the solid lubricant coating 21. Next, the area to be coated in the threaded joint for pipes is calculated from the thread shape and dimension (inside diameter, wall thickness, etc.). The area to be coated corresponds to the area of the threaded surface with recesses and projections supposing that it is unfolded to a flat configuration. The average thickness of the solid lubricant coating 21 over the threaded joint 1 for pipes is calculated from the time of composition application to the threaded joint 1 for pipes, the area to be coated therein, and the density of the solid lubricant coating 21.

Corrosion Protective Solid Coating

In the threaded joint for pipes described above, one of the contact surfaces of the pin 5 and the box 8 may include the solid lubricant coating 21 and the other of the contact surfaces of the pin 5 and box 8 may include a corrosion protective solid coating including a UV-curable resin. As described above with reference to FIG. 1, the threaded joint 1 for pipes, in some cases, is stored for a long period of time before being actually used. In such a case, the corrosion protective solid coating, if formed, increases the corrosion resistance of the pin 5 or the box 8.

The corrosion protective solid coating includes a UV-curable resin. This enables the corrosion protective solid coating to exhibit strength sufficient to prevent damage that may be caused by the force applied at the time of attachment of a protector. Moreover, the corrosion protective solid coating does not dissolve even when it is exposed to condensed water, associated with the dew point, during transport or storage. Furthermore, even under high temperatures more than 40° C., the corrosion protective solid coating does not soften easily.

The UV-curable resin is a resin composition well known in the art. The UV-curable resin is not particularly limited as long as it includes monomers, oligomers, and photopolymerization initiators and can be photopolymerized by irradiation with UV light to form a cured coating.

The monomers include, for example, poly (di-, tri-, or higher) esters of polyhydric alcohols with (meth)acrylic acids and at least one selected from the group consisting of various types of (meth)acrylate compounds, N-vinylpyrrolidone, N-vinylcaprolactam, and styrene. The oligomers include, for example, at least one selected from the group consisting of epoxy (meth)acrylates, urethane (meth)acrylates, polyester (meth)acrylates, polyether (meth)acrylates, and silicone (meth) acrylates.

The photopolymerization initiator is preferably a compound having an absorbance at a wavelength of 260 to 450 nm. Examples of the photopolymerization initiator include at least one selected from the group consisting of benzoin and derivatives thereof, benzophenone and derivatives thereof, acetophenone and derivatives thereof, Michler's ketone, benzyl and derivatives thereof, tetraalkylthiuram monosulfide, and thioxanes. Preferably, the photopolymerization initiators are thioxanes.

The corrosion protective solid coating may include additives such as a lubricating agent, an anti-rust agent, and a filler. The corrosion protective solid coating may include only one of the additives or two or more of them. This increases the strength and lubricity of the corrosion protective solid coating. Examples of the lubricating agent include metallic soaps and polytetrafluoroethylene (PTFE) resins. The corrosion protective solid coating includes one, or more than one of these additives in a mass ratio between the additive and the UV-curable resin of 0.05 to 0.35:1, for example. Examples of the anti-rust agent include aluminum tripolyphosphate and aluminum phosphite. The corrosion protective solid coating includes the anti-rust agent in a mass ratio between the anti-rust agent and the UV-curable resin of at most 0.10:1, for example. Examples of the filler include fibrous fillers. Fibrous fillers improve the strength of the coating.

The corrosion protective solid coating may include a coloring agent. This facilitates quality inspection by visual inspection or by image processing. Examples of the coloring agents include pigments, dyes, and fluorescent materials. These coloring agents are not particularly limited and may be commercially available products. The corrosion protective solid coating includes the coloring agent in a mass ratio between the coloring agent and the UV-curable resin of at most 0.05:1, for example.

The corrosion protective solid coating may be a two or more layer coating that can be formed on the contact surface by repeating application of the composition for forming a corrosion protective solid coating and irradiation with UV light. The multi-layer corrosion protective solid coating has further increased coating strength. As a result, breakage of the corrosion protective solid coating is inhibited even under the force applied during fastening of the threaded joint 1 for pipes. Consequently, the threaded joint 1 for pipes exhibits further increased corrosion resistance.

The thickness of the corrosion protective solid coating (total thickness in the case where the corrosion protective solid coating is formed of two or more layers of UV-curable resin) is preferably in the range of 5 to 50 μm and is more preferably in the range of 10 to 40 μm. When the thickness of the corrosion protective solid coating is not less than 5 μm, the threaded joint 1 for pipes exhibits consistently high corrosion resistance. When the thickness of the corrosion protective solid coating is not greater than 50 μm, damage to the corrosion protective solid coating during attachment of the protector is inhibited. The thickness of the corrosion protective solid coating is preferably smaller than the thickness of the solid lubricant coating 21 of the mating member. This results in consistently high lubricity of the solid lubricant coating 21.

Production Method

Hereinafter, a method according to the present embodiment for producing the threaded joint 1 for pipes will be described.

Formation of Solid Lubricant Coating 21

A method according to the present embodiment for producing the threaded joint 1 for pipes includes an application step and a solidification step. In the application step, the composition described above is applied to at least one of the contact surfaces of the pin 5 and the box 8. In the solidification step, the composition applied to the contact surface is solidified to form the solid lubricant coating 21.

Firstly, the composition is prepared. The composition of a solventless type may be prepared, for example, by heating the binder to a molten state, adding the lubricant additive, anti-rust additive, and plasticizer thereto, and mixing them. The composition may be made of a powder mixture prepared by mixing all the components in powder form. The composition of a solvent type may be prepared, for example, by dissolving or dispersing the binder, lubricant additive, anti-rust additive, and plasticizer in a solvent and mixing them.

Application Step

In the application step, the composition is applied to the contact surface by a method known in the art. For the composition of a solventless type, a hot melt process may be employed to apply the composition. In the hot melt process, the composition is heated to melt the binder to a fluid state with low viscosity. The composition in a fluid state can be sprayed from a spray gun having functions for temperature holding. The composition is heated and melted within a tank including a suitable stirring mechanism, is supplied via a metering pump to the spray head (held at a predetermined temperature) of the spray gun by a compressor, and is sprayed. The holding temperatures for the tank interior and the spray head are adjusted in accordance with the melting point of the binder in the composition. Another application method, such as brushing or dipping, may be employed in place of spray coating. The temperature to which the composition is heated is preferably higher than the melting point of the binder by 10 to 50° C. Prior to application of the composition, at least one contact surface, to which the composition is to be applied, of the pin 5 or of the box 8, is preferably heated to a temperature higher than the melting point of the base. This makes it possible to achieve good coating properties. In the case of the composition of a solvent type, the composition in solution form is applied to the contact surface by spray coating or by another method. In this case, the viscosity of the composition is to be adjusted so that it can be applied by spraying in an environment at normal temperature and pressure.

Solidification Step

In the solidification step, the composition applied to the contact surface is solidified to form the solid lubricant coating 21. In the case of the composition of a solventless type, the solid lubricant coating 21 is formed by cooling the composition applied to the contact surface to allow the composition in a molten state to solidify. The cooling process can be carried out by a method known in the art. Examples of the cooling process include natural cooling and air cooling. In the case of the composition of a solvent type, the solid lubricant coating 21 is formed by drying the composition applied to the contact surface to allow the composition to solidify. The drying process can be carried out by a method known in the art. Examples of the drying process include natural drying, low-temperature air drying, and vacuum drying. The solidification step may be carried out by rapid cooling using, for example, a nitrogen gas cooling system or a carbon dioxide cooling system. In the case where rapid cooling is performed, the cooling is carried out in an indirect manner at the opposite surface to the contact surface (in the case of the box 8, at the outer surface of the steel pipe 2 or the coupling 3, and in the case of the pin 5, at the inner surface of the steel pipe 2). This inhibits degradation of the solid lubricant coating 21 that may be caused by rapid cooling. Through the steps described above, the threaded joint 1 for pipes of the present embodiment can be produced.

Formation of Corrosion Protective Solid Coating

When the corrosion protective solid coating is to be formed, the production method further includes a step of applying the composition for forming a corrosion protective solid coating and a step of irradiating the composition with UV light. In the step of applying the composition for forming the corrosion protective solid coating, the composition for forming a corrosion protective solid coating is applied to the contact surface on which the solid lubricant coating 21 is not formed. In the step of irradiating the composition with UV light, UV light is directed to the contact surface to which the composition for forming a corrosion protective solid coating has been applied, to thereby form the corrosion protective solid coating.

The composition for forming a corrosion protective solid coating can be prepared by mixing the components to be contained in the corrosion protective solid coating. For example, the above-described UV-curable resin including monomers, oligomers, and photopolymerization initiators, an additive, a lubricating agent, and a coloring agent are mixed. For mixing, a stirring mechanism known in the art may be employed.

The method for applying the composition for forming a corrosion protective solid coating may employ a method known in the art. Examples of the application method include spray coating, brushing, and dipping. After the composition for forming a corrosion protective solid coating has been applied, a light beam (e.g., UV light) is directed to the applied composition for forming a corrosion protective solid coating. The composition for forming a corrosion protective solid coating is cured by the irradiation with a light beam to form the corrosion protective solid coating.

UV light irradiation can be carried out by using a commercially available UV irradiation apparatus having an output wavelength of 220 to 450 nm. Examples of UV irradiation sources include high pressure mercury lamps, super-high pressure mercury lamps, xenon lamps, carbon arc lamps, metal halide lamps, and sunlight. The irradiation time and UV-irradiation intensity may be set appropriately. Either the solid lubricant coating 21 or the corrosion protective solid coating may be formed first.

Surface Preparation Treatment

Typically, the surface roughness of the contact surfaces of the threaded joint 1 for pipes is in the range of approximately 3 to 5 µm. When the surface roughness of the contact surface is large, the adhesion properties of the coating (solid lubricant coating 21 or corrosion protective solid coating) formed on the contact surface increase. As a result, the threaded joint 1 for pipes exhibits even higher galling resistance and corrosion resistance. Accordingly, it is preferred that the contact surface to which the composition for forming the solid lubricant coating is to be applied is subjected to a surface preparation treatment. For example, the surface preparation treatment is at least one selected from the group consisting of a sand blasting treatment, a pickling treatment, a chemical conversion treatment, and a metal plating treatment.

Sand Blasting Treatment

The sand blasting treatment is a treatment in which a blast material (abrasive) is mixed with compressed air and the mixture is propelled onto the contact surface. Examples of the blast material include spherical shot material and angular grit material. The sand blasting treatment increases the surface roughness of the contact surface. The sand blasting treatment may be carried out by a method known in the art. For example, air is compressed by a compressor and a blast material is mixed with the compressed air. The blast material may be made of, for example, stainless steel, aluminum, ceramic, or alumina. The sand blasting treatment conditions such as propelling speed may be set appropriately.

Pickling Treatment

The pickling treatment is a treatment in which the contact surface is immersed and roughened in a solution of a strong acid such as sulfuric acid, hydrochloric acid, nitric acid, or hydrofluoric acid. This increases the surface roughness of the contact surface.

Chemical Conversion Treatment

The chemical conversion treatment is a treatment in which a porous chemical conversion coating having a high surface roughness is formed. Examples of the chemical conversion treatment include phosphate chemical conversion treatments, oxalate chemical conversion treatment, and borate chemical conversion treatment. From the standpoint of adhesion properties of the solid lubricant coating 21 and the corrosion protective solid coating, a phosphate chemical conversion treatment is preferred. The phosphate chemical conversion treatment is, for example, a phosphate chemical conversion treatment using manganese phosphate, zinc phosphate, manganese iron phosphate, or calcium zinc phosphate.

The phosphate chemical conversion treatment can be carried out by a method known in the art. The treatment solution may be a common acidic solution for phosphate chemical conversion treatment for zinc-plated products. An example of the solution is a solution for zinc phosphate chemical conversion treatment containing 1 to 150 g/L of phosphate ions, 3 to 70 g/L of zinc ions, 1 to 100 g/L of nitrate ions, and 0 to 30 g/L of nickel ions. Solutions for manganese phosphate chemical conversion treatments, which are conventionally used for threaded joint for pipes 1, may also be used. The temperature of the solution is in the range of room temperature to 100° C., for example. The treatment time may be set depending on the desired thickness of the coating and, for example, may be 15 minutes. To facilitate the formation of the chemical conversion coating, surface modification may be performed prior to the phosphate chemical conversion treatment. The surface modification refers to the treatment including immersion in a surface modification aqueous solution containing colloidal titanium. After the phosphate chemical conversion treatment, it is preferred that rinsing with water or with warm water is carried out before drying.

The chemical conversion coating is porous. Thus, when the solid lubricant coating 21 and the corrosion protective solid coating are formed on the chemical conversion coatings, the so-called "anchoring effect" is produced and, as a result, the solid lubricant coating 21 and the corrosion protective solid coating exhibit further increased adhesion properties. The thickness of the phosphate coating is preferably in the range of 5 to 40 µm. When the thickness of the phosphate coating is not less than 5 µm, sufficient corrosion resistance is ensured. When the thickness of the phosphate coating is not greater than 40 µm, the solid lubricant coating 21 and the corrosion protective solid coating exhibit consistently high adhesion properties.

Metal Plating Treatment

Examples of the metal plating treatment include electroplating treatments and impact plating treatments. Other metal plating treatments include, for example, composite metal plating treatments in which a coating including solid particulates dispersed in a metal is formed.

The electroplating treatment increases the galling resistance and corrosion resistance of the threaded joint 1 for pipes. Examples of the electroplating treatment include: treatments of applying a single layer plating including Cu, Su, or Ni metal or a single layer plating including a Cu—Sn alloy as disclosed in Japanese Patent Application Publication No. 2003-74763 (Patent Literature 3); treatments of applying a two-layer plating including a Cu layer and Sn layer; and treatments of applying a three-layer plating including a Ni layer, Cu layer, and Sn layer. For steel pipes formed from a steel having a Cr content of 5% or greater, preferred treatments are a Cu—Sn alloy plating treatment, a two-layer plating treatment in which a Cu plating and a Sn plating are applied, and a three-layer plating treatment in which a Ni plating, a Cu plating, and a Sn plating are applied. More preferred treatments are a two-layer coating treatment in which a Cu plating and a Sn plating are applied, a three-layer plating treatment in which a Ni strike plating, a Cu plating, and a Sn plating are applied, and a Cu—Sn—Zn alloy plating treatment.

The electroplating treatment can be carried out by a method known in the art. For example, a plating bath including ions of the metal elements to be contained in the alloy plating is prepared. Next, at least one of the contact surfaces of the pin 5 and the box 8 is immersed in the plating bath. By current conduction through the contact surface, the alloy plating film is formed on the contact surface. The treatment conditions including the temperature of the plating bath and the duration of the plating treatment may be set appropriately. In the case of multi-layer plating treatments, the thickness of the lowermost plating layer is preferably less than 1 μm.

The thickness of the plating layer (total thickness of plating layers in the case of multi-layer plating) is preferably in the range of 5 to 15 μm.

Examples of the impact plating treatments include mechanical plating treatments and projection plating treatments. In the present embodiment, application of plating only to the contact surface suffices. Therefore, it is preferable to employ a projection plating treatment, which is capable of local application of plating. Projection plating treatments are carried out, for example, by projecting particles onto the contact surface to form the metal coating. Preferably, the thickness of the alloy layer formed by the impact plating treatment is preferably in the range of 5 to 40 μm. This results in increased corrosion resistance and adhesion properties of the threaded joint 1 for pipes.

Trivalent Chromating Treatment

In the case where the electroplating treatment, particularly a zinc alloy plating treatment, is performed, a trivalent chromating treatment may be performed after the electroplating treatment. The trivalent chromating treatment is a treatment for forming a trivalent chromium chromate coating. The coating formed by the trivalent chromating treatment inhibits white rust that may form on the surface of the zinc alloy plating layer. This improves the appearance of the product. (The white rust on the zinc alloy plating layer is not rust of the base metal of the threaded joint for pipes. Thus, the rust does not affect the galling resistance or the corrosion resistance of the threaded joint for pipes.) When the solid lubricant coating is formed further on the trivalent chromate coating, the solid lubricant coating exhibits further increased adhesion properties. The trivalent chromating treatment may be carried out by a method known in the art. For example, at least one of the contact surfaces of the pin 5 and the box 8 is immersed in a chromating solution or the chromating solution is sprayed onto the contact surface. Thereafter, the contact surface is rinsed with water. Alternatively, the contact surface is immersed in the chromating solution and, after current conduction, rinsed with water. Alternatively, the chromating solution is applied to the contact surface and dried by heating. The treatment conditions for trivalent chromating may be set appropriately.

With regard to the surface preparation treatments described above, only one of the treatments may be performed or a plurality of the treatments may be performed in combination. In the case where a single surface preparation treatment is to be performed, it is preferable to perform at least one surface preparation treatment selected from the group consisting of a sand blasting treatment, a pickling treatment, a phosphate chemical conversion treatment, and a zinc alloy plating treatment. Two or more surface preparation treatments may be performed. In such a case, a sand blasting treatment is performed first and thereafter a phosphate chemical conversion treatment is performed, for example. Alternatively, after the sand blasting treatment, a zinc alloy plating treatment may be performed. Alternatively, after the sand blasting treatment, a zinc alloy plating treatment may be performed, and further, a trivalent chromating treatment may be performed. After these surface preparation treatments are performed, the solid lubricant coating 21 or the corrosion protective solid coating is formed. This results in further increased adhesion properties and corrosion resistance of the solid lubricant coating 21 and the corrosion protective solid coating.

The pin 5 and the box 8 may be subjected to the same surface preparation treatment or the pin 5 and the box 8 may be subjected to different surface preparation treatments. As a surface preparation treatment for the solid lubricant coating 21, a manganese phosphate chemical conversion treatment is preferred, and as a surface preparation treatment for the corrosion protective solid coating, a zinc phosphate chemical conversion treatment and a zinc or a zinc-iron alloy plating treatment using an impact plating treatment are preferred.

Whichever surface preparation treatment is employed from among the sand blasting treatment, pickling treatment, and impact plating treatment, it is preferred that the surface preparation treatment is performed so as to obtain a surface roughness Rz of from 5 to 40 μm. When the surface roughness Rz is not less than 5 μm, the solid lubricant coating 21 and the corrosion protective solid coating exhibits further increased adhesion properties. When the surface roughness Rz is not greater than 40 μm, friction is inhibited and therefore damage and delamination of the solid lubricant coating 21 and the corrosion protective solid coating are inhibited.

EXAMPLE

An example of the present invention will be described below. It should be noted that the present invention is not limited to the example. In the example, the contact surface of the pin is referred to as the pin surface and the contact surface of the box is referred to as the box surface. Unless otherwise specified, percent and parts in the example refer to mass percent and mass parts, respectively.

Production of Box for Protector Attachment and Detachment Test

To evaluate the adhesion properties of the solid lubricant coating formed from the composition of the present embodiment, a protector attachment and detachment test was conducted. For the test, boxes of VAM21 (registered trademark) threaded joint for pipes manufactured by NIPPON STEEL & SUMITOMO METAL CORPORATION were used. The threaded joint for pipes had an outside diameter of 177.80 mm (7 inches) and a wall thickness of 1.151 cm (0.453 inches). The steel grades of the threaded joint for pipes were carbon steel (C:0.21%, Si:0.25%, Mn:1.1%, P:0.02%, S:0.01%, Cu:0.04%, Ni:0.06%, Cr:0.17%, Mo:0.04%, and the balance: Fe and impurities).

The box surfaces were subjected to a Cu—Sn—Zn alloy plating treatment. The Cu—Sn—Zn alloy plating treatment was carried out by an electroplating treatment. The plating bath used was a plating bath manufactured by NIHON KAGAKU SANGYO CO., LTD. The electroplating treatment was performed under conditions, a pH of 14, a temperature of 45° C., a current density of 2 A/dm$^2$, and a treatment time of 40 minutes. The Cu—Sn—Zn alloy plating layer had a chemical composition, Cu: about 63%, Sn: about 30%, and Zn: about 7%. The composition having a component composition shown in Table 1 was applied to the Cu—Sn—Zn alloy plating layer. The composition was heated to 130° C., applied to the box surface by spraying, and cooled, to thereby form a solid lubricant coating on the box surface.

In all test numbers, the thickness of the solid lubricant coating formed from the composition was 50 μm.

TABLE 1

| | Component composition of composition for forming lubricant coating (mass %) | | | | | | | |
|---|---|---|---|---|---|---|---|---|
| | Binder | | | | | Lubricant additive | | Total |
| Test No. | Ethylene vinyl acetate resin | Polyolefin resin | Paraffin wax | Total binder content | Earthy graphite | Polytetrafluoro-ethylene (PTFE) | Perfluoro-polyether (PFPE) | lubricant additive content |
| 1 | 25 | 17 | 31 | 73 | 6 | 4 | 9.9 | 19.9 |
| 2 | 25 | 17 | 31 | 73 | 6 | 4 | 9.5 | 19.5 |
| 3 | 25 | 17 | 31 | 73 | 5 | 4 | 10 | 19 |
| 4 | 25 | 17 | 31 | 73 | 5 | 4 | 10 | 19 |
| 5 | 25 | 17 | 31 | 73 | 5 | 4 | 10 | 19 |
| 6 | 25 | 17 | 31 | 73 | 5 | 4 | 10 | 19 |
| 7 | 25 | 17 | 31 | 73 | 5 | 4 | 10 | 19 |
| 8 | 25 | 17 | 31 | 73 | 5 | 4 | 10 | 19 |
| 9 | 25 | 17 | 31 | 73 | 6 | 4 | 10 | 20 |

| | Component composition of composition for forming lubricant coating (mass %) | | | | |
|---|---|---|---|---|---|
| | Anti-rust additive | | Total | | |
| Test No. | Calcium ion-exchanged silica | Aluminum phosphite | anti-rust additive content | Plasticizer | Plasticizer content |
| 1 | 5 | 2 | 7 | Bis(2-ethylhexyl) sebacate | 0.1 |
| 2 | 5 | 2 | 7 | Bis(2-ethylhexyl) sebacate | 0.5 |
| 3 | 5 | 2 | 7 | Bis(2-ethylhexyl) sebacate | 1 |
| 4 | 5 | 2 | 7 | Bis(2-ethylhexyl) adipate | 1 |
| 5 | 5 | 2 | 7 | Diisodecyl adipate | 1 |
| 6 | 5 | 2 | 7 | Diisononyl adipate | 1 |
| 7 | 5 | 2 | 7 | Bis(2-ethylhexyl) azelate | 1 |
| 8 | 5 | 2 | 7 | Tricresyl phosphate | 1 |
| 9 | 5 | 2 | 7 | — | — |

Protector Attachment and Detachment Test

Figure 4:
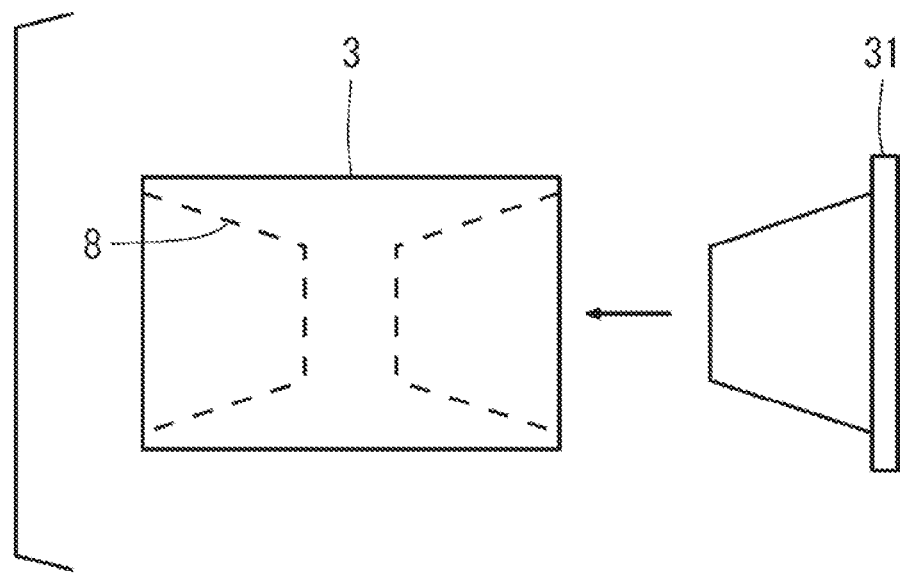
FIG. 4 is a diagram illustrating a protector attachment and detachment test.

Using the boxes, each including the solid lubricant coating formed from the composition shown in Table 1, the adhesion properties of the solid lubricant coatings were evaluated. FIG. 4 is a diagram illustrating the protector attachment and detachment test. Attachment and detachment of a protector 31 was performed on the box 8 three times at room temperature (20° C.). Subsequently, the protector 31 was attached to the box 8 at room temperature (20° C.) and the box 8 (coupling 3) with the protector 31 on was held for 24 hours at −40° C. Thereafter, the box 8 with the protector 31 on was held for 24 hours at 70° C. The cooling-heating cycle of 24-hour holding at −40° C. and 24-hour holding at 70° C. was performed seven times. After completion of the cooling-heating cycle, detachment and attachment of the protector 31 was performed at room temperature (20° C.) once. The protector 31 was detached and the degree of wear and delamination of the solid lubricant coating was evaluated by visual inspection. The results are shown in Table 2.

TABLE 2

| Test No. | Protector attachment and detachment test Wear and delamination of solid lubricant coating 1) |
|---|---|
| 1 | Not severe coating delamination |
| 2 | Slight coating delamination |
| 3 | None |
| 4 | None |
| 5 | Not severe coating delamination |
| 6 | Not severe coating delamination |
| 7 | Not severe coating delamination |
| 8 | Not severe coating delamination |
| 9 | Severe coating delamination |

1) Slight coating delamination: delamination area fraction <5% Not severe coating delamination: delamination area fraction 5 to 10% Severe coating delamination: delamination area fraction >10%

Evaluation Results

The compositions of Test Nos. 1 to 8 included a plasticizer. As a result, wear and delamination in the solid lubricant coating was not greater than 10% by area even after it was repeatedly exposed to the temperatures of −40° C. and 70° C. The composition of Test No. 3 included bis(2-ethylhexyl) sebacate as the plasticizer in an amount of 1 mass %. As a result, no wear or delamination was observed in the solid lubricant coating even after it was repeatedly exposed to the temperatures of −40° C. and 70° C. The composition of Test No. 4 included bis(2-ethylhexyl) adipate as the plasticizer in an amount of 1 mass %. As a result, no wear or delamination was observed in the solid lubricant coating even after it was repeatedly exposed to the temperatures of −40° C. and 70° C.

On the other hand, the composition of Test No. 9 did not include a plasticizer. As a result, wear and delamination in the solid lubricant coating was greater than 10% by area after it was repeatedly exposed to the temperatures of −40° C. and 70° C. Presumably, this resulted from a decrease in adhesion properties of the solid lubricant coating.

Production of Pins and Boxes for Galling Resistance Evaluation Test and Salt Water Spray Test The galling resistance and corrosion resistance of the threaded joint for pipes including the solid lubricant coating formed from the composition were evaluated. For the evaluation, VAM21 (registered trademark) threaded joint for pipes manufactured by NIPPON STEEL & SUMITOMO METAL CORPORATION were used. The threaded joint for pipes had an outside diameter of 244.48 mm (9-5/8 inches) and a wall thickness of 1.199 cm (0.472 inches). The steel grades of the threaded joint for pipes were carbon steel or 13 Cr steel (high Cr steel), which have galling tendencies compared with carbon steel. The carbon steel had a chemical composition, C:0.21%, Si:0.25%, Mn:1.1%, P:0.02%, S:0.01%, Cu:0.04%, Ni:0.06%, Cr:0.17%, Mo:0.04%, and the balance: Fe and impurities. The 13 Cr steel had a chemical composition, C:0.19%, Si:0.25%, Mn:0.8%, P:0.02%, S:0.01%, Cu:0.04%, Ni:0.1%, Cr:13.0%, Mo:0.04%, and the balance: Fe and impurities. Using the steel grades shown in Table 3, finish machine grinding (surface roughness of 3 μm) was performed on the pin surface and the box surface of each test number.

Thereafter, the surface preparation treatments shown in Table 3 were carried out and the solid lubricant coatings and the corrosion protective solid coatings were formed. The solid lubricant coatings were formed from the compositions of the respective test numbers in Table 1. In Table 3, the column "solid lubricant coating" lists the compositions used to form the solid lubricant coatings and the thicknesses of the solid lubricant coatings obtained.

TABLE 3

| Test No. | Steel grade | | Surface Preparation 1 (Thickness) | Surface Preparation Treatment 2 (Thickness) | Corrosion protective solid coating (Thickness) | Solid lubricant coating (Thickness) |
|---|---|---|---|---|---|---|
| 10 | Carbon steel | Pin surface | Zinc phosphate chemical conversion treatment (8 μm) | — | Corrosion protective solid coating (25 μm) | — |
| | | Box surface | Manganese phosphate chemical conversion treatment (12 μm) | — | — | Test No. 3 (50 μm) |
| 11 | Carbon steel | Pin surface | Zn—Ni alloy plating (8 μm) | Chromate (trivalent) (0.3 μm) | — | — |
| | | Box surface | Zn—Ni alloy plating (8 μm) | — | — | Test No 4 (50 μm) |
| 12 | Carbon steel | Pin surface | Zn—Ni alloy plating (8 μm) | Chromate (trivalent) (0.3 μm) | — | Test No 3 (50 μm) |
| | | Box surface | Zn—Ni alloy plating (8 μm) | Chromate (trivalent) (0.3 μm) | — | Test No 3 (50 μm) |
| 13 | High Cr steel | Pin surface | Zn—Ni alloy plating (8 μm) | Chromate (trivalent) (0.3 μm) | — | — |
| | | Box surface | Cu—Sn—Zn alloy plating (8 μm) | — | — | Test No 3 (50 μm) |
| 14 | High Cr steel | Pin surface | Sand blasting | — | — | Test No 3 (50 μm) |
| | | Box surface | Zn—Ni alloy plating (8 μm) | — | — | Test No 3 (50 μm) |
| 15 | High Cr steel | Pin surface | Sand blasting | Zn—Ni alloy plating (8 μm) | — | Test No 3 (50 μm) |
| | | Box surface | Sand blasting | Zn—Ni alloy plating (8 μm) | — | Test No 3 (50 μm) |
| 16 | Carbon steel | Pin surface | Zn—Ni alloy plating (8 μm) | Chromate (trivalent) (0.3 μm) | — | — |
| | | Box surface | Zn—Ni alloy plating (8 μm) | — | — | Test No 9 (50 μm) |

Specific methods for carrying out the surface preparation treatments and specific methods for forming the coatings are set forth below.

Test No. 10

The pin surface was immersed in a solution for zinc phosphate chemical conversion treatment at 75 to 85° C. for 10 minutes to form a zinc phosphate coating having a thickness of 8 μm (surface roughness Rz of 8 μm). A composition for forming a corrosion protective solid coating was applied to the zinc phosphate coating. The composition for forming a corrosion protective solid coating included an acrylic resin-based UV-curable resin, aluminum phosphite, and a polyethylene wax in a ratio of 1:0.05:0.01. The applied composition for forming a corrosion protective solid coating was irradiated with UV light to form a corrosion protective solid coating having a thickness of 25 μm. The resultant corrosion protective solid coating was transparent. The UV irradiation conditions were as follows.

UV lamp: air-cooled mercury vapor lamp;
Output of UV lamp: 4 kW; and
UV wavelength: 260 nm.

The box surface was immersed in a solution for manganese phosphate chemical conversion treatment at 80 to 95° C. for 10 minutes to form a manganese phosphate coating having a thickness of 12 μm (surface roughness Rz of 10 μm). Further, the composition of Test No. 3 in Table 1 was heated to 130° C., applied to the manganese phosphate coating by spraying, and cooled to form a solid lubricant coating having a thickness of 50 μm.

Test No. 11

The pin surface and the box surface were subjected to a Zn—Ni alloy plating treatment by an electroplating treatment. The plating bath used was DAIN Zinalloy N-PL (trade name) manufactured by Daiwa Fine Chemicals Co., Ltd. The thickness of the Zn—Ni alloy plating layers was 8 μm. The electroplating was performed under conditions, a pH of 6.5, a temperature of 25° C., a current density of 2 A/dm$^2$, and a treatment time of 18 minutes. The Zn—Ni alloy plating layer had a chemical composition, Zn:85% and Ni:15%. Furthermore, only the pin surface was subjected to a trivalent chromating treatment. The trivalent chromating solution used was DAIN Chromate TR-02 (trade name) manufactured by Daiwa Fine Chemicals Co., Ltd. The trivalent chromating treatment was performed under conditions, a temperature of 25° C., a pH of 4.0, and a treatment time of 50 seconds. It is estimated that the thickness of the trivalent chromate coating was 0.3 μm. Further, only to the box surface, the composition of Test No. 4 in Table 1 was applied in the same manner as that for the box surface of Test No. 10 to form a solid lubricant coating having a thickness of 50 μm.

Test No. 12

The pin surface and the box surface were subjected to the same treatment. The pin surface and the box surface were subjected to a Zn—Ni plating treatment in the same manner as that in Test No. 11, and further, they were subjected to a trivalent chromating treatment in the same manner as that for the pin surface of Test No. 11. The thickness and the chemical composition of the Zn—Ni alloy plating layer were similar to those of Test No. 11. It is estimated that the thickness of the trivalent chromate coating also was similar to the thickness of Test No. 11. Further, the composition of Test No. 3 in Table 1 was applied in the same manner as that for the box surface of Test No. 10 to form a solid lubricant coating having a thickness of 50 μm.

Test No. 13

The pin surface was subjected to the same treatments as those for the pin surface of Test No. 11. The thickness and the chemical composition of the resultant Zn—Ni alloy plating layer were similar to those of Test No. 11. It is estimated that the thickness of the trivalent chromate coating also was similar to the thickness of Test No. 11. The box surface was subjected to an electroplating treatment to form a Cu—Sn—Zn alloy plating layer having a thickness of 8 μm on the box surface. The plating bath used was a plating bath manufactured by NIHON KAGAKU SANGYO CO., LTD. The electroplating treatment was performed under conditions, a pH of 14, a temperature of 45° C., a current density of 2 A/dm$^2$, and a treatment time of 40 minutes. The Cu—Sn—Zn alloy plating layer had a chemical composition, Cu: about 63%, Sn: about 30%, and Zn: about 7%. The composition of Test No. 3 in Table 1 was applied to the Cu—Sn—Zn alloy plating layer in the same manner as that for the box surface of Test No. 10 to form a solid lubricant coating having a thickness of 50 μm.

Test No. 14

The pin surface was subjected to a sand blasting treatment. The pin surface, after being subjected to the sand blasting treatment, had a surface roughness Ra of 1.0 μm and a surface roughness Rz of 5.2 μm. As used herein, the surface roughness Ra and surface roughness Rz refer to the arithmetic mean roughness Ra and the maximum height roughness Rz, respectively, as specified in JIS B 0601:2013. After the sand blasting treatment, the composition of Test No. 3 in Table 1 was applied to the box surface in the same manner as that for the box surface of Test No. 10 to form a solid lubricant coating having a thickness of 50 μm. The box surface was subjected to a Zn—Ni alloy plating treatment in the same manner as that for the box surface of Test No. 11. The thickness and the chemical composition of the Zn—Ni alloy plating layer were similar to those of Test No. 11. The composition of Test No. 3 in Table 1 was applied further to the Zn—Ni alloy plating layer in the same manner as that for the box surface of Test No. 10 to form a solid lubricant coating having a thickness of 50 μm.

Test No. 15

The pin surface and box surface were subjected to the same treatments. The pin surface and the box surface were subjected to a sand blasting treatment in the same manner as that for the pin surface of Test No. 14. Furthermore, they were subjected to a Zn—Ni alloy plating treatment in the same manner as that for the box surface of Test No. 11. The thickness and the chemical composition of the Zn—Ni alloy plating layers were similar to those of Test No. 11. Furthermore, the composition of Test No. 3 in Table 1 was applied in the same manner as that for the box surface of Test No. 10 to form a solid lubricant coating having a thickness of 50 μm.

Test No. 16

The same treatments as those of Test No. 11 were performed except that the composition used to form the solid lubricant coating on the box surface was the composition of Test No. 9 in Table 1. The thickness and the chemical composition of the Zn—Ni alloy plating layers were similar to those of Test No. 11. It is estimated that the thickness of the trivalent chromate coating also was similar to the thickness of Test No. 11.

Galling Resistance Evaluation Test

Protector attachment and detachment was performed three times at room temperature (20° C.) on the pins and boxes having the solid lubricant coatings (specifically the pins of Test Nos. 12, 14, and 15 and the boxes of Test Nos.

10 to 16). Subsequently, the protectors were attached to the pins and the boxes at room temperature (20° C.), and the pins and the boxes with the protectors on were held at −40° C. for 24 hours. Subsequently, the pins and the boxes with the protectors on were held at 70° C. for 24 hours. The cooling-heating cycle of 24-hour holding at −40° C. and 24-hour holding at 70° C. was performed seven times. After completion of the cooling-heating cycle, detachment and attachment of the protector was performed at room temperature (20° C.) once.

A repeating fastening test was conducted on the pins and the boxes of all test numbers, including the pins and the boxes that had undergone the attachment and detachment of the protectors. Specifically, fastening and unfastening of each threaded joint for pipes was performed 10 times. The tightening speed was 10 rpm and the tightening torque was 42.8 kN·m. The fastening and unfastening of the threaded joint for pipes was performed at room temperature (20° C.). Each time one cycle of thread fastening and unfastening is completed, the occurrence of galling was examined by visual inspection and by a change in torque during fastening. When the galling flaws were correctable and refastening was possible, correction was performed and the test was continued. When the thread fastening became impossible, the test was terminated. The results are shown in Table 4.

Salt Water Spray Test

Test specimens subjected to the same treatments as those performed on the pins and the boxes of Test Nos. 10 to 16 were prepared. Using the specimens, a salt water spray test was conducted in accordance with JIS Z 2371:2000. In the salt water spray test, the cooling-heating cycle was not performed. The results are shown in Table 4.

TABLE 4

| Test No. | Occurrence of galling 1) (Numerical values: number of fastening operations) | | | | | | | | | | Salt water spray test in accordance with JIS Z2371: 2000 (1000 hours) 2) |
|---|---|---|---|---|---|---|---|---|---|---|---|
| | 1 | 2 | 3 | 4 | 5 | 6 | 7 | 8 | 9 | 10 | |
| 10 | A | A | A | A | A | A | A | A | A | A | No rust |
| 11 | A | A | A | A | A | A | A | A | A | A | No rust |
| 12 | A | A | A | A | A | A | A | A | A | A | No rust |
| 13 | A | A | A | A | A | A | A | A | A | A | No rust |
| 14 | A | A | A | A | A | A | A | A | A | A | No rust |
| 15 | A | A | A | A | A | A | A | A | A | A | No rust |
| 16 | A | A | A | B | B | C | — | — | — | — | No rust |

(Remarks)
1) A: No galling;
B: Slight galling (galling flaws correctable and refastening possible);
C: Severe galling (uncorrectable); and —: Test ended
2) No rust for 750 hours or more were judged to be sufficiently rust resistant for long time storage Evaluation Results With reference to Table 4, the threaded joint for pipes of Test Nos. 10 to 15 each included, on at least one of the contact surfaces of the pin and the box, a solid lubricant coating formed from the composition containing a plasticizer. As a result, although the threaded joint for pipes were repeatedly exposed to the temperatures of −40° C. and 70° C. and moreover underwent thread fastening and unfastening 10 times, galling did not occur. Furthermore, in the salt water spray test, formation of rust was not observed either on the pin surface or on the box surface after 1000 hours.

In contrast, the solid lubricant coating of the threaded joint for pipes of Test No. 16 was a solid lubricant coating formed from a composition that does not contain a plasticizer. As a result, after being repeatedly subjected to the temperatures of −40° C. and 70° C., slight galling occurred at the fourth operation of the thread fastening and unfastening. In further operations of thread fastening and unfastening, uncorrectable galling occurred at the sixth operation.

In the foregoing description, the present invention has been described in connection with an embodiment considered to be preferable at this time, but the present invention is not limited to the embodiment described above. Modifications may be made without departing from the technical ideas of the invention that can be read from the claims and the entire specification, and it is to be understood that threaded joints incorporating such modifications are also encompassed within the technical scope of the present invention.

INDUSTRIAL APPLICABILITY

The present invention is applicable to threaded joint for pipes.

REFERENCE SIGNS LIST

1: Threaded joint for pipes
4: Male threaded portion
5: Pin
7: Female threaded portion
8: Box
10, 13: Metal seal portion
11, 12: Shoulder portion
21: Solid lubricant coating

The invention claimed is:

1. A threaded joint for pipes, the threaded joint comprising a pin and a box each comprising a contact surface, the contact surface comprising a threaded portion and an unthreaded metal contact portion,
   the threaded joint for pipes comprising a solid lubricant coating on at least one of the contact surfaces of the pin and the box,
   the solid lubricant coating comprising:
      a binder comprising at least one member selected from the group consisting of an ethylene vinyl acetate resin, a polyolefin resin, and a wax;
      a lubricant additive;
      an anti-rust additive; and
      a plasticizer comprising at least one member selected from the group consisting of bis(2-ethylhexyl) sebacate, diisodecyl adipate, diisononyl adipate, bis(2-ethylhexyl) azelate, and tricresyl phosphate,
   wherein the solid lubricant coating comprises the binder in an amount of 60 to 80 mass %, the lubricant additive in an amount of 10 to 25 mass %, the anti-rust additive in an amount of 2 to 10 mass %, and the plasticizer in an amount of 0.2 to 5 mass %.

2. The threaded joint for pipes according to claim 1,
   wherein the lubricant additive comprises at least one member selected from the group consisting of earthy graphite, graphite fluoride, perfluoropolyether, and polytetrafluoroethylene,
   wherein the anti-rust additive comprises at least one member selected from the group consisting of calcium ion-exchanged silica and aluminum phosphite, and
   wherein the plasticizer comprises at least one member selected from the group consisting of bis(2-ethylhexyl) adipate and bis(2-ethylhexyl) sebacate.

3. The threaded joint for pipes according to claim 1, wherein one of the contact surfaces of the pin and the box comprises the solid lubricant coating, and the other of the contact surfaces of the pin and the box comprises a corrosion protective solid coating comprising a UV-curable resin.

4. The threaded joint for pipes according to claim 3, wherein a thickness of the corrosion protective solid coating is in a range of 5 to 50 µm.

5. The threaded joint for pipes according to claim 1, wherein a thickness of the solid lubricant coating is in a range of 10 to 200 µm.

6. A composition for forming a solid lubricant coating on a threaded joint for pipes according to claim 1, the composition comprising:
a binder;
a lubricant additive;
an anti-rust additive; and
a plasticizer.

7. The composition according to claim 6, wherein the plasticizer comprises at least one selected from the group consisting of bis(2-ethylhexyl) adipate and bis(2-ethylhexyl) sebacate.

8. The composition according to claim 6, wherein a content of the plasticizer is in a range of 0.2 to 5 mass %.

9. The composition according to claim 7, wherein a content of the plasticizer is in a range of 0.2 to 5 mass %.

10. The composition according to claim 6,
wherein the binder comprises at least one selected from the group consisting of an ethylene vinyl acetate resin, a polyolefin resin, and a wax,
wherein the lubricant additive comprises at least one selected from the group consisting of earthy graphite, graphite fluoride, perfluoropolyether, and polytetrafluoroethylene, and
wherein the anti-rust additive comprises at least one selected from the group consisting of calcium ion-exchanged silica and aluminum phosphite.

11. The composition according to claim 7,
wherein the binder comprises at least one selected from the group consisting of an ethylene vinyl acetate resin, a polyolefin resin, and a wax,
wherein the lubricant additive comprises at least one selected from the group consisting of earthy graphite, graphite fluoride, perfluoropolyether, and polytetrafluoroethylene, and
wherein the anti-rust additive comprises at least one selected from the group consisting of calcium ion-exchanged silica and aluminum phosphite.

12. The composition according to claim 8,
wherein the binder comprises at least one selected from the group consisting of an ethylene vinyl acetate resin, a polyolefin resin, and a wax,
wherein the lubricant additive comprises at least one selected from the group consisting of earthy graphite, graphite fluoride, perfluoropolyether, and polytetrafluoroethylene, and
wherein the anti-rust additive comprises at least one selected from the group consisting of calcium ion-exchanged silica and aluminum phosphite.

13. The composition according to claim 9,
wherein the binder comprises at least one selected from the group consisting of an ethylene vinyl acetate resin, a polyolefin resin, and a wax,
wherein the lubricant additive comprises at least one selected from the group consisting of earthy graphite, graphite fluoride, perfluoropolyether, and polytetrafluoroethylene, and
wherein the anti-rust additive comprises at least one selected from the group consisting of calcium ion-exchanged silica and aluminum phosphite.

14. A method for producing a threaded joint for pipes according to claim 1, the threaded joint comprising a pin and a box each comprising a contact surface, the contact surface comprising a threaded portion and an unthreaded metal contact portion, the method comprising:
applying the composition according to claim 6 to at least one of the contact surfaces of the pin and the box; and
solidifying the composition applied to the contact surface to form a solid lubricant coating.

15. The method according to claim 14 for producing the threaded joint for pipes, the method comprising:
applying the composition to one of the contact surfaces of the pin and the box;
solidifying the composition applied to the contact surface to form a solid lubricant coating;
applying a composition for forming a corrosion protective solid coating to the other of the contact surfaces of the pin and the box, the composition for forming the corrosion protective solid comprising a UV-curable resin; and
irradiating, with UV light, the contact surface having the composition for forming the corrosion protective solid coating applied thereto, to form the corrosion protective solid coating.

16. The method according to claim 14 for producing the threaded joint for pipes, the method further comprising:
subjecting the contact surface, to which the composition for forming the solid lubricant coating is to be applied, to a surface preparation treatment prior to application of the composition, the surface preparation treatment being at least one selected from the group consisting of a sand blasting treatment, a pickling treatment, a phosphate chemical conversion treatment, and a zinc alloy plating treatment.

17. The method according to claim 15 for producing the threaded joint for pipes, the method further comprising:
subjecting the contact surface, to which the composition for forming the solid lubricant coating is to be applied, to a surface preparation treatment prior to application of the composition, the surface preparation treatment being at least one selected from the group consisting of a sand blasting treatment, a pickling treatment, a phosphate chemical conversion treatment, and a zinc alloy plating treatment.

18. The method according to claim 16 for producing the threaded joint for pipes, wherein the surface preparation treatment comprises the zinc alloy plating treatment, and
the method further comprises a trivalent chromating treatment that is performed subsequent to the zinc alloy plating treatment and prior to the application of the composition for forming the solid lubricant coating, the trivalent chromating treatment being performed on at least one of the contact surfaces of the pin and the box, the at least one contact surface having been subjected to the zinc alloy plating treatment.

19. The method according to claim 17 for producing the threaded joint for pipes, wherein the surface preparation treatment comprises the zinc alloy plating treatment, and
the method further comprises a trivalent chromating treatment that is performed subsequent to the zinc alloy plating treatment and prior to the application of the composition for forming the solid lubricant coating, the trivalent chromating treatment being performed on at least one of the contact surfaces of the pin and the box, the at least one contact surface having been subjected to the zinc alloy plating treatment.

\* \* \* \* \*